United States Patent [19]
Nagai et al.

[11] Patent Number: 5,211,435
[45] Date of Patent: May 18, 1993

[54] APPARATUS FOR HOLDING BY SUCTION AND CONVEYING

[75] Inventors: Shigekazu Nagai; Shuuzou Sakurai; Tadasu Kawamoto, all of Ibaraki, Japan

[73] Assignee: SMC Kabushiki Kaisha, Tokyo, Japan

[21] Appl. No.: 769,848

[22] Filed: Oct. 2, 1991

[30] Foreign Application Priority Data

| Oct. 4, 1990 | [JP] | Japan | 2-105141[U] |
| Oct. 4, 1990 | [JP] | Japan | 2-105143[U] |
| Oct. 5, 1990 | [JP] | Japan | 2-104998[U] |

[51] Int. Cl.⁵ ............................................. B66C 1/02
[52] U.S. Cl. ............................... 294/64.1; 901/40
[58] Field of Search ............ 294/64.1, 64.2, 64.3, 294/65; 901/40; 285/81, 82, 86, 87, 308, 313

[56] References Cited

U.S. PATENT DOCUMENTS

| 2,832,130 | 4/1958 | Harvey | 285/81 X |
| 3,152,828 | 10/1964 | Lytle | 294/64.1 |
| 3,223,442 | 12/1965 | Fawdry et al. | 294/64.1 |
| 3,428,340 | 2/1969 | Pelton | 285/308 X |
| 4,583,910 | 4/1986 | Borgman et al. | |
| 4,600,278 | 7/1986 | Tarbuck | 901/40 X |
| 4,767,142 | 8/1988 | Takahashi et al. | 294/64.1 |

FOREIGN PATENT DOCUMENTS

| 2354033 | 5/1975 | Fed. Rep. of Germany . |
| 3036116 | 5/1982 | Fed. Rep. of Germany . |
| 3242167 | 12/1983 | Fed. Rep. of Germany . |
| 412430 | 1/1974 | U.S.S.R. ............ 285/86 |
| 431693 | 2/1992 | United Kingdom . |

Primary Examiner—Russell D. Stormer
Assistant Examiner—Dean J. Kramer
Attorney, Agent, or Firm—Oblon, Spivak, McClelland, Maier & Neustadt

[57] ABSTRACT

Disclosed herein is an apparatus for holding by suction and conveying. The apparatus comprises a pipe joint connected to a vacuum and suction source through a tube; a cylindrical connector connected to a suction pad; and a connecting member through which the pipe joint is coupled to the connector. The connecting member includes a cylindrical member angularly movably surrounding the outer periphery of the connector, and between the cylindrical member and the connector, is provided structure inhibiting the movement of the cylindrical member in a direction of the longitudinal axis thereof.

8 Claims, 8 Drawing Sheets

APPARATUS FOR HOLDING BY SUCTION AND CONVEYING

FIELD OF THE INVENTION

The present invention relates to an apparatus for holding by suction and conveying (hereinafter referred to as "suction and conveying apparatus") which serves to hold a work by suction using a vacuum and suction source and convey it.

DESCRIPTION OF THE PRIOR ART

In order to convey, for example, works in the form of a thin plate, there has heretofore been used suction and conveying apparatus equipped with a suction pad, which communicates with a vacuum and suction source. In this case, the vacuum and suction source is connected to the suction pad through a tube. This tube is detachably joined to the suction and conveying apparatus by a pipe joint equipped with a release bush.

Figure 1:
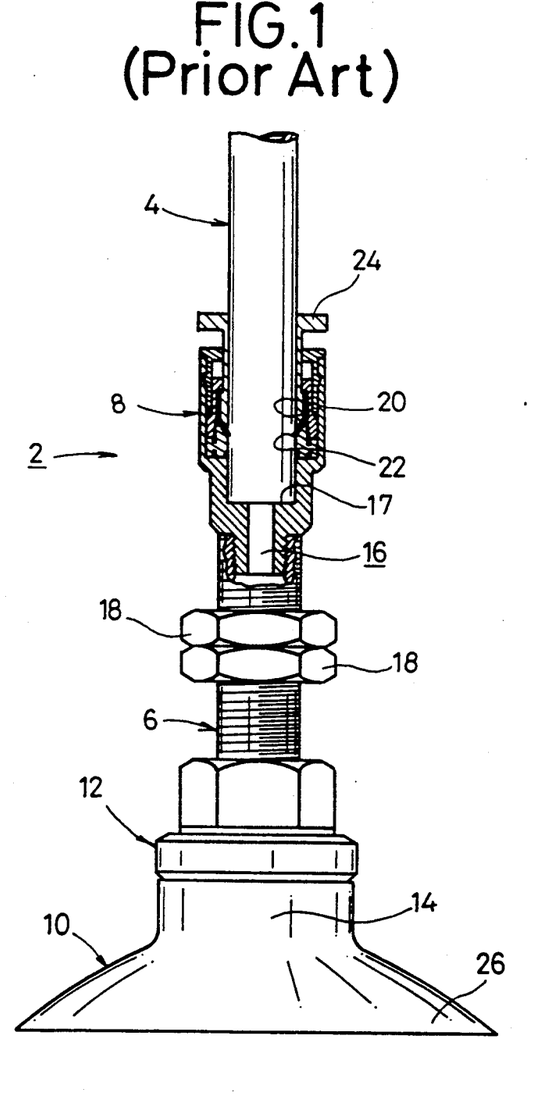
FIG. 1 is an elevational view, partly in vertical section, of a suction and conveying apparatus according to the prior art, which makes use of a suction pad.

A suction and conveying apparatus of this kind will then be described with reference to FIG. 1.

The suction and conveying apparatus 2 basically comprises a tube 4 for connecting the suction and conveying apparatus 2 to a vacuum and suction source (not illustrated), a pipe joint 8 for joining the tube 4 to a tubular member 6 and an adapter 12 for fitting a suction pad 10 to the tubular member 6. In the interior of the pipe joint 8, is provided a through-hole 16 for allowing a root part 14 of the suction pad 10 to communicate with the tube 4 in an axial direction of the tubular member 6 so as to suck air from the interior of a skirt part 26 of the suction pad 10 or to feed air for vacuum break. The through-hole 16 is once expanded from the middle to form a step 17 there.

The pipe joint 8 includes a chuck member 20, in which an interlocking part 22 sticking into the tube 4 to prevent the release of the tube 4 therefrom is provided, and a release bush 24 for expanding the interlocking part 22 under pushing action toward the main body of the pipe joint 8. Two nuts 18 which serve to fix this tubular member 6 to an arm of a robot (not illustrated) are fitted on the periphery of the tubular member 6.

The installation and removal of the tube 4 by the pipe joint 8 is carried out in the following manner.

The case of installation of the tube 4 is first of all described. The tube 4 is inserted into the interior of the pipe joint 8 until its tip comes into contact with the step 17. When the tube 4 is then pulled up outside, namely, in a direction from lower to upper in FIG. 1, to a small extent, the acute interlocking part of the chuck member 20 in contact with the tube 4 is stuck into the tube 4, so that the release of the tube 4 is prevented.

In the case of the removal of the tube 4 on the other hand, the release bush 24 is pushed. As a result, the interlocking part 22 of the chuck member 20, which engages with the release bush 24, is pushed in a direction outside the pipe joint 8, whereby the tube 4 is released from the stuck state. In consequence, it is possible to take the tube 4 out of the pipe joint 8.

In this instance, a pushing pressure may be applied to the release bush 24 due to careless operation of an operator, contact of tools and materials with the release bush 24, or the like. As a result, the tube 4 is released from the state stuck by the interlocking part 22, whereby the tube 4 slips out of the pipe joint 8. There is thus a fear that the interior of the skirt part 26 can not be kept at a predetermined negative pressure, so that a work held by the suction pad 10 falls down.

Moreover, in the prior art described above, a vacuum outlet of the adapter is fixed in a certain direction. Therefore, there may be in some cases a potential problem that when the adapter is installed on the robot arm, the tube inserted in the vacuum outlet loosens, twists or entangles with the turning and movement of the robot arm, thereby interfering with the exact positioning of works.

In addition, the tube may be damaged by such looseness, torsion, etc. in some case.

Furthermore, the length of the tube becomes redundant from the relation with the installation site of the vacuum and suction source if the taking-out direction of the tube connected to the vacuum and suction source is limited due to the fixation of the vacuum outlet. Therefore, piping for air requires a space for equipping with a tube of a superfluous length. For this reason, there may be in some cases a potential problem that the piping for air can not be performed if the piping space is limited to a small area.

SUMMARY OF THE INVENTION

It is a general object of this invention to provide a suction and conveying apparatus in which when a tube communicating with a suction pad is connected to an adapter through a pipe joint, it is possible to prevent the tube from slipping out of the pipe joint even if a release bush as a constituent part of the pipe joint is unnecessarily pushed.

It is a principal object of this invention to provide a suction and conveying apparatus in which when a tube communicating with a suction pad is connected to an adapter through a pipe joint, a joint guide surrounding the tube is fitted to the pipe joint, whereby the releasing operation of a release bush can be inhibited by the joint guide.

Another object of this invention is to provide a suction and conveying apparatus which is equipped with a connecting member angularly movable about a longitudinal axis of an adapter connected to a suction pad to hold the suction pad, said connecting member being joined with a tube so as to make the tube angularly movable, whereby the taking-out direction of the tube is not limited and a limited space can be effectively utilized.

A further object of this invention is to provide a suction and conveying apparatus comprising a pipe joint connected to a vacuum and suction source through a tube; a cylindrical connector connected to a suction pad; and a connecting member through which the pipe joint is coupled to the connector, said connecting member including a cylindrical member angularly movably surrounding the outer periphery of the connector, and between said cylindrical member and said connector, being provided a means for inhibiting the movement of the cylindrical member in a direction of the longitudinal axis thereof.

Still a further object of this invention is to provide a suction and conveying apparatus wherein the means for inhibiting the movement of the cylindrical member comprises an annular projection provided on one surface of the inner peripheral surface of the cylindrical member and the outer peripheral surface of the connector, and an annular recess provided in the other surface.

Yet still a further object of this invention is to provide a suction and conveying apparatus further comprising a coupling member for swingably coupling the pipe joint to the connecting member, said coupling member being provided between the connecting member and the pipe joint.

Yet still a further object of this invention is to provide a suction and conveying apparatus wherein the coupling member includes a ball joint.

Yet still a further object of this invention is to provide a suction and conveying apparatus further comprising a pipe joint installed to the cylindrical member and equipped with a release bush capable of freely detaching a tube by its pushing; a joint guide fitted so as to surround the release bush, said joint guide having a projecting part, which enters a circular groove defined between the release bush and the guide member to fix the release bush.

Yet still a further object of this invention is to provide a suction and conveying apparatus wherein the joint guide is constructed so as to be openable and closable through a hinged part.

Yet still a further object of this invention is to provide a suction and conveying apparatus wherein the joint guide has a guide part for guiding the tube in a predetermined direction.

Yet still a further object of this invention is to provide a suction and conveying apparatus wherein the guide part of the joint guide is bent.

Yet still a further object of this invention is to provide a suction and conveying apparatus wherein the guide part of the joint guide has a plurality of holes bored in its wall surface.

Other objects and advantages of the present invention will be readily appreciated from the preferred embodiments of this invention, which will be described subsequently in detail with reference to the accompanying drawings.

DETAILED DESCRIPTION OF THE PREFERRED EMBODIMENTS

Figure 2:
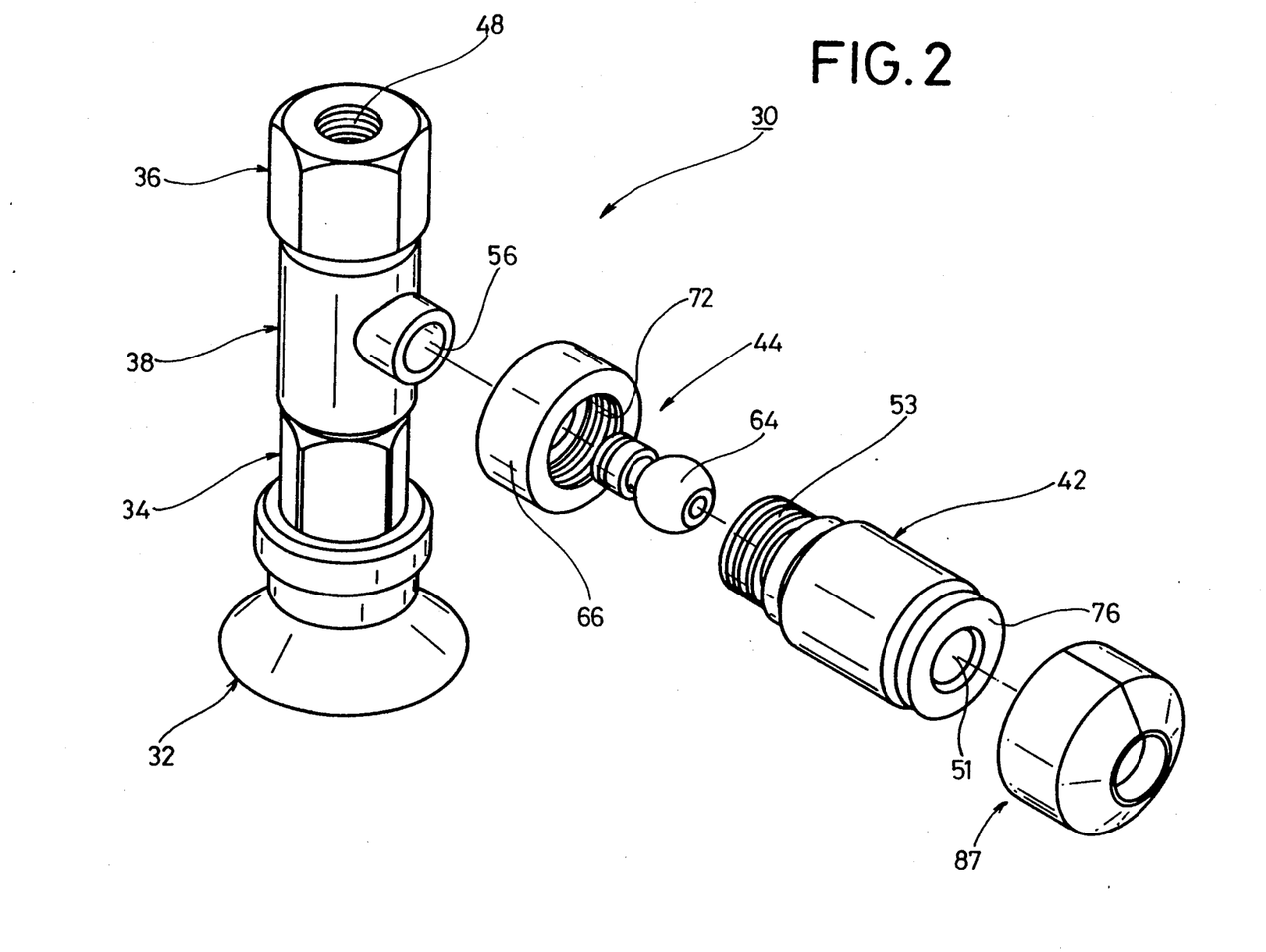
FIG. 2 is an explanatory exploded perspective view of a suction and conveying apparatus according to the present invention.
Figure 3:
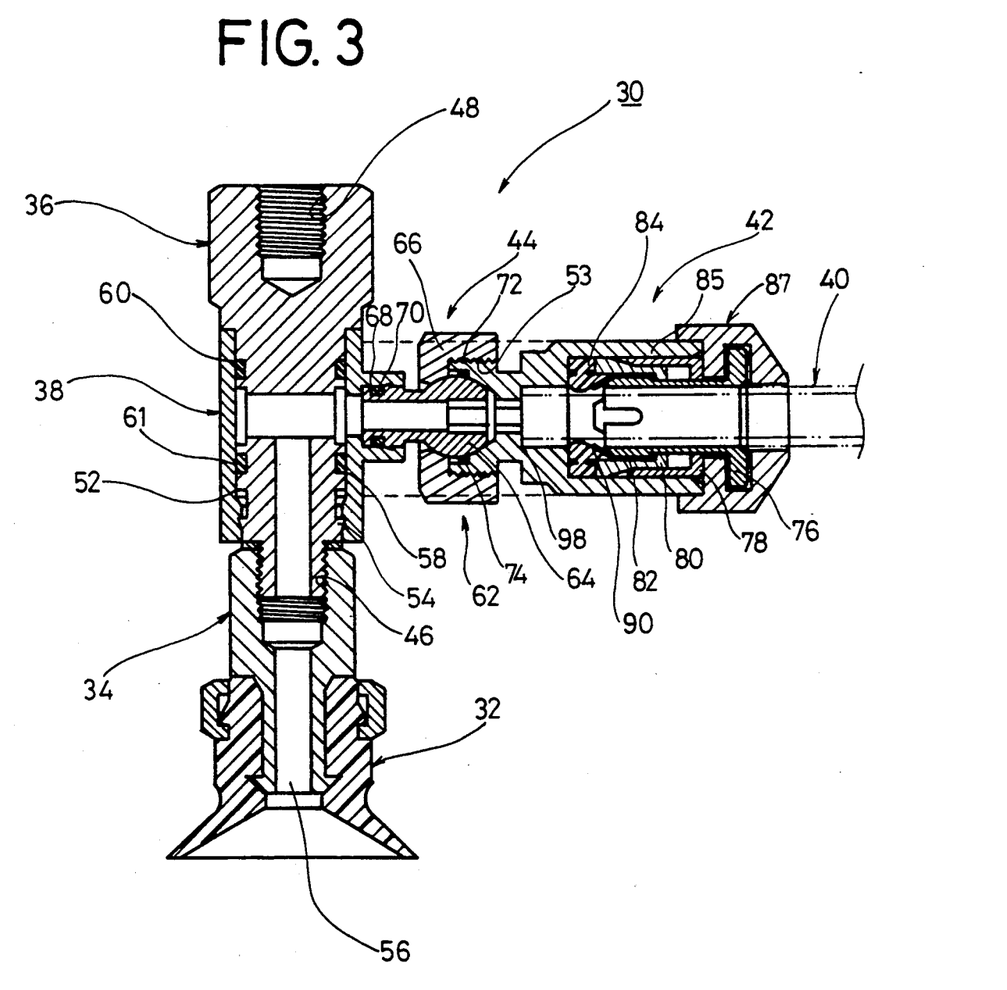
FIG. 3 is an explanatory vertical cross-sectional view of the suction and conveying apparatus shown in FIG. 2.

FIG. 2 is a perspective view of a suction and conveying apparatus according to the present invention, and FIG. 3 is a vertical cross-sectional view of the suction and conveying apparatus shown in FIG. 2.

Referring now to the drawings, the suction and conveying apparatus 30 comprises a cylindrical connector 36 for connecting an adaptor 34 fitted to a suction pad 32, a cylindrical sleeve 38 angularly movably surrounding the outer periphery of the connector 36, a pipe joint 42 connected to a vacuum and suction source (not illustrated) through a tube 40, and a coupling member 44 through which the cylindrical sleeve 38 is connected to the pipe joint 42.

The connector 36 serving to fit the suction pad 32 is in the form of a cylinder, and has an externally threaded part 46 screwed in an internally threaded part of the adapter 34 at its lower portion and an internally threaded part 48 for joining to the tip of an arm of a robot at its upper portion.

The pipe joint 42 has in its interior a tube connecting mechanism 50, which will be described subsequently, for connecting the tube 40 communicating with the unillustrated vacuum and suction source. An opening 51 through which the tube 40 is inserted is provided in one end of the pipe joint 42, and an externally threaded part 53 for connecting to the coupling member 44 is cut in the other end.

The cylindrical sleeve 38 is fitted so as to surround the outer periphery of the connector 36 and is connected loosely so as to be angularly movable. In order to inhibit the movement of the cylindrical sleeve 38 in a direction of the longitudinal axis of the connector 36, a circular groove 52 is cut in the outer peripheral surface of the connector 36 to define an annular recess, and an annular projection 54 is provided on the inner peripheral surface of the cylindrical sleeve 38 to engage it with the annular recess. In order to keep the airtightness of a through-hole 56 in the connector 36 when the cylindrical sleeve 38 turns about the outer periphery of the connector 36, circular grooves 58 are cut in the outer peripheral surface of the connector 36 to fit O-rings 60, 61 therein.

In this embodiment, a ball joint 62 is used as the coupling sleeve 44 through which the cylindrical member 38 is connected to the pipe joint 42.

It is however needless to say that the tube connecting mechanism 50 may be formed integrally with the cylindrical sleeve 38 as indicated by broken lines in FIG. 3 so as to permit direct rotation of the tube connecting mechanism 50 about the connector 36.

The ball joint 62 is made up of a ball part 64 with a cylindrical part formed integrally with the ball part 64, and another cylindrical sleeve 66 fitted over the outer peripheral surface of the ball part 64.

The ball joint 62 is connected to the cylindrical sleeve 38 at one end of its cylindrical part. In order to keep the airtightness of the through-hole 56 upon their connection, a circular groove 68 is cut in the cylindrical part to fit an O-ring 70 therein.

The sleeve 66 is provided, at one end of its inner peripheral surface, with an internally threaded part 72 portion of the ball part at the other end of the inner peripheral surface.

One end of the sleeve 66 and an opening-defining surface of the externally threaded part 53, which is provided on one end of the pipe joint 42, are united to a spherical surface of the ball part 64 so as to envelop the ball part, whereby the portion united to the spherical surface can slidably move so as to permit the pivotal movement of the pipe joint 42.

Namely, the cylindrical part of the ball joint 62 is fixedly connected to the cylindrical sleeve 38, and the ends of the sleeve 66 and pipe joint 42, which have been connected to each other by the threaded parts 53, 72, come, on their inner surfaces, into slidable contact with the ball part. Therefore, the pipe joint 42 can freely move about the ball part as a pivot.

The tube 40 is connected to such a pipe joint 42 through the tube connecting mechanism 50, whereby the tube 40 is also pivotally movable together with the pipe joint 42.

In order to keep the airtightness of the through-hole 56 upon their connection, an O-ring 74 is provided on the united portion of the opening-defining surface of the externally threaded part 53 of the pipe joint 42 and the ball part 64.

The tube connecting mechanism 50 provided within the pipe joint 42 will hereinafter be described.

Figure 4:
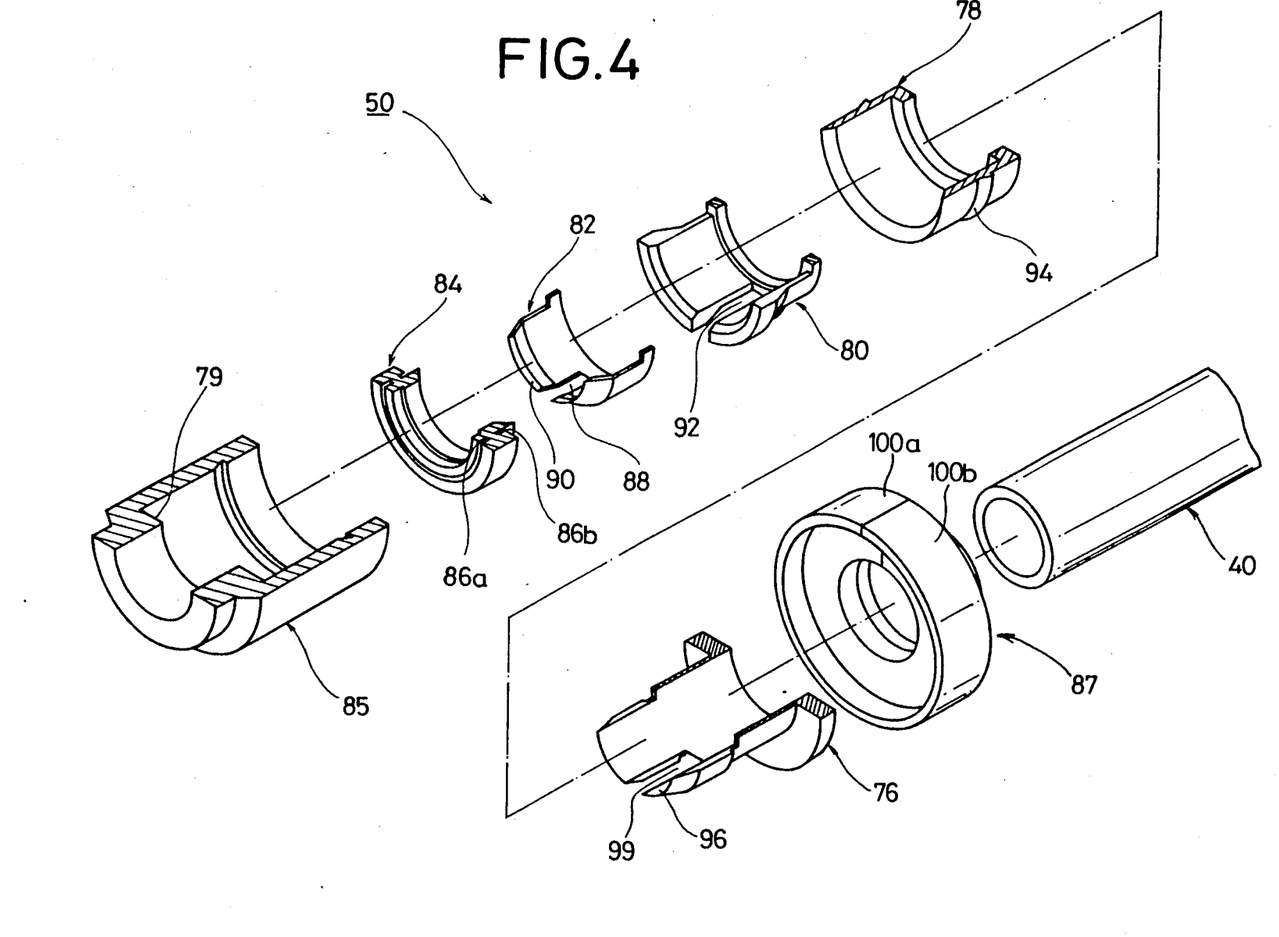
FIG. 4 is an exploded perspective view, partly broken away, of a pipe joint structure in the suction and conveying apparatus illustrated in FIG. 3.

FIG. 4 is an exploded perspective view, partly broken away, of the tube connecting mechanism 50 by which so-called one-touch joint is made up.

The tube connecting mechanism 50 is constructed by arranging in order a guide member 78, a collet 80, a chuck member 82, a sealing member 84, a pipe joint body 85 and a joint guide 87 outside a release bush 76 in which one end of the tube 40 is inserted.

To begin with, it is preferable to form the sealing member 84 from, for example, an elastic material such as natural rubber or synthetic rubber from the functional point of view. Circumferential grooves 86a, 86b are cut on its inner and outer sides, respectively.

The chuck member 82 is generally formed in the shape of a ring from an elastic metal plate. A plurality of slits 88 are cut at equal intervals in its side wall. Its free end has a blade 90 and is bent inside. As illustrated in the drawing, the blade is preferably made sharp.

Preferably, the collet 80 is also made up of a flexible material such as synthetic rubber, and a plurality of slits 92 are cut at equal intervals in its side wall like the chuck member 82.

On the guide member 78, is formed an annular projection 94. The annular projection 94 engages with the pipe joint body 85 because it has flexibility.

The release bush 76 is formed in the shape of a cylinder and has an edge 96 at its free end. The surface of the edge 96 comes into contact with the blade 90 of the chuck member 82. Also, a plurality of slits 99 are cut like the chuck member 82 and collet 80.

Figure 5:
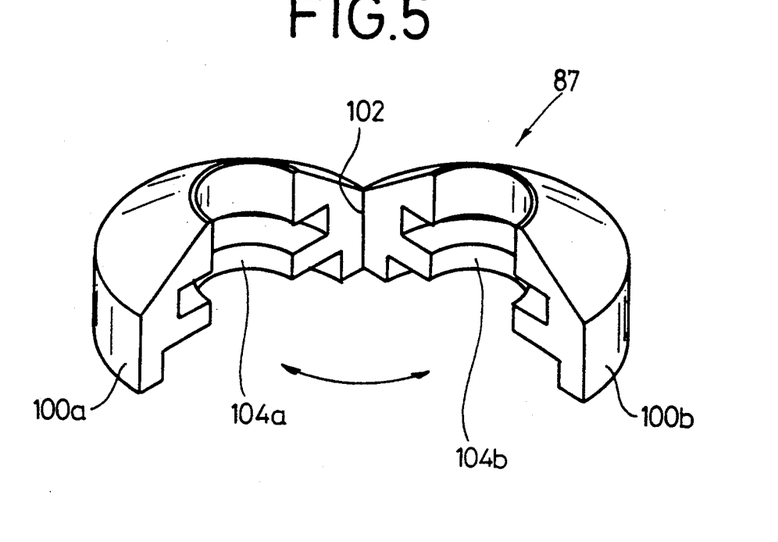
FIG. 5 is an explanatory perspective view of a joint guide in the pipe joint mechanism illustrated in FIG. 4.

As illustrated in FIG. 5, the joint guide 87 is composed of flexible members 100a, 100b and is in the form of substantially a truncated cone. The members are connected to each other through a hinged part 102 at which their one edges are united.

Semiannular projections 104a, 104b are provided inside the flexible members 100a, 100b, respectively. The projections 104a, 104b can enter a circular groove defined by the guide member 78 and the release bush 76 at will. This can prevent the joint guide 87 from separating from the guide member 78.

The operation of the suction and conveying apparatus constructed as described above will now be described. The tube 40 is introduced in the release bush 76 and inserted until the tip of the tube 40 comes into contact with the bottom 79 through the hole 51 which extends through the center of the pipe joint body 85 and through which the tube 40 is inserted. At that time, the edge of the blade 90 of the chuck member 82 nips and holds the tube 40 made of a flexible material.

In this case, the annular projection 104a, 104b fits in the circular groove defined between the release bush 76 and the guide member 78 to inhibit the movement of the release bush 76 in a direction of the longitudinal axis. Therefore, it is possible to prevent the tube 40 from slipping off.

In the case of the removal of the tube 40 from the pipe joint body 85 on the other hand, the joint guide 87 is opened about the hinged part 102 as a pivot point to remove it. The release bush 76 is then pushed to bend the flexible blade 90 outside. The blade 90 is thus disengaged from the tube 40, thereby permitting the removal of the tube 40. As described above, the tube 40 can be inserted and removed with ease by one-touch operation.

Then, the operation of the pipe joint 42, in which the tube 40 has been inserted, for example, in the case where works are conveyed using the tube connecting mechanism 50 and coupling member 44 as described above will be described.

The connector 36 is attached to a tip of an arm of a robot through the internally threaded part 48, and moves in an arc in accordance with the movement of the arm of the robot when holding a work by suction and conveying it. At that time, the cylindrical member 38 attached to the outer periphery of the connector 36 turns about the connector 36. Therefore, the pipe joint 42 connected to the cylindrical sleeve 38 also turns together with the tube 40. In the turning, they turn in a direction perpendicular to the longitudinal axis of the connector 36.

Upon the turning, the pipe joint 42 can pivotally move in all directions on the ball part in the coupling member 66 of the ball joint 62. The pipe joint 42 itself may also turn about its longitudinal axis.

Accordingly, the combination of the cylindrical sleeve 38 and the ball joint 62 makes it possible for the pipe joint 42 to which the tube 40 has been connected to pivotally move in every direction.

Figure 6:
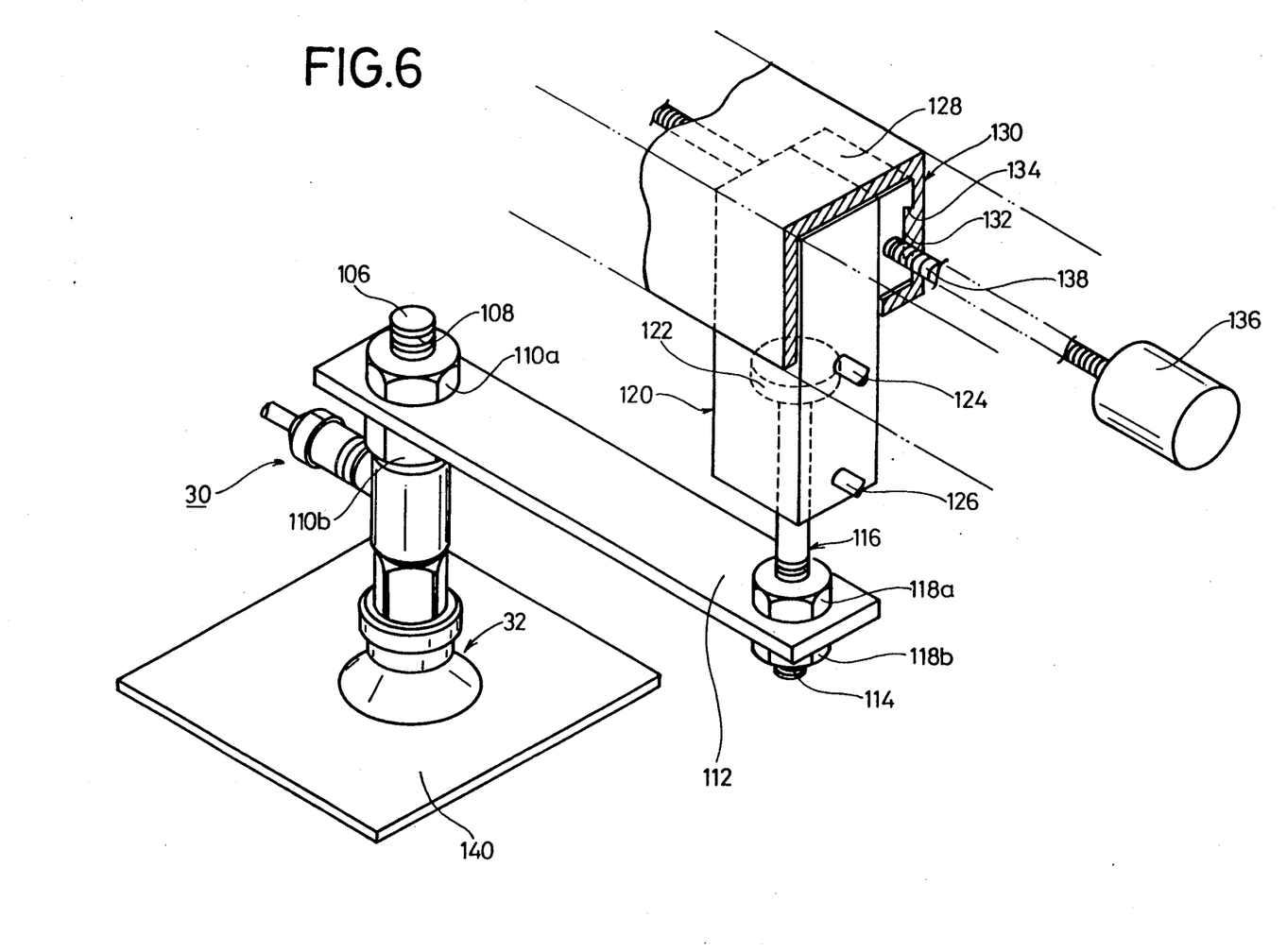
FIG. 6 is an explanatory perspective view illustrating the installed state of the suction and conveying apparatus according to the present invention.

FIG. 6 illustrates one embodiment of a conveying apparatus which takes a place of the robot performing the above-described operation.

As illustrated in FIG. 6, a suction pad 32 is installed on the suction and conveying apparatus 30, and a lower end of a rod-like member 106 is screwed in the internally threaded part 48 as a constituent part of the suction and conveying apparatus 30.

The rod-like member 106 has an externally threaded part 108 of a given length, on which a pair of nuts 110a, 110b are screwed. One end of an arm 112, through which the rod-like member 106 is inserted, is put between the pair of the nuts 110a, 110b to fasten it tightly, whereby the suction and conveying apparatus 30 is fixed to the end of the arm 112.

Similarly, another rod-like member 116 having an externally threaded part 114 of a given length is inserted through the other end of the arm 112, at which the arm 112 is put between a pair of nuts 118a, 118b to fasten it tightly, whereby the arm 112 is fixed to the rod-like member 116.

The rod-like member 116 is connected to a piston contained in a cylinder 120 and is positioned on the downward extension of the piston 122.

In order to vertically move the piston 122 within the cylinder 120, tubes 124, 126 are connected to an upper part and a lower part in the cylinder 120, respectively. The tubes 124, 126 are connected to a source of air supply (not illustrated).

The cylinder 120 is installed on a slider 128 to unite therewith. A casing 130 is provided thereon from the outside.

The casing 130 has a projecting part 132 on its inner side wall along its longitudinal direction. The projecting part 132 is slidably fitted in a groove provided on one side wall of the slider 128.

A threaded hole is cut in the slider 128, and a ball screw 138 connected to a motor 136 is caused to pass through the threaded hole.

The operation of this apparatus will then be described.

As illustrated in FIG. 6, a work 140 is first of all held under suction by a skirt part of a suction pad 32.

Air is then fed from the air supply source into the lower part of the cylinder 120 through the tube 126 connected to the lower part of the cylinder 120, thereby displacing the piston upward. Accordingly, the suction pad 32 is also displaced upward through the arm 112.

The ball screw 138 connected to a shaft of the motor 136 is then turned on its own axis, thereby moving the slider 128 in the horizontal direction. Accordingly, the cylinder 120 united with the slider 128 is also moved.

Therefore, the suction pad 32 joined to the cylinder 120 through the arm 112 is also moved by a desired distance in the horizontal direction as it holds the work 140.

When the suction pad 32 with the work 140 held reaches a position over a target site where the work 140 is to be conveyed, in the above-described manner, the motor 136 is cut out, thereby stopping the horizontal movement. At this time, air is fed through the tube 124 connected to the upper part of the cylinder 120 to displace the piston 122 downward, whereby it is possible to place the work 140 on the target site, and then separate the suction pad 32 from the work 140.

As described above, the use of the suction and conveying apparatus according to this invention with the mechanism capable of moving in horizontal and vertical directions makes it possible to displace the tube 40 corresponding to the vertical and horizontal movement.

Incidentally, it is possible to finely adjust the height of the suction pad 32 through the arm 112 by controlling positions of two pairs of the nuts 110a, 110b and 118a, 118b which are screwed on the rod-like members 106 and 114, respectively.

Figure 7:
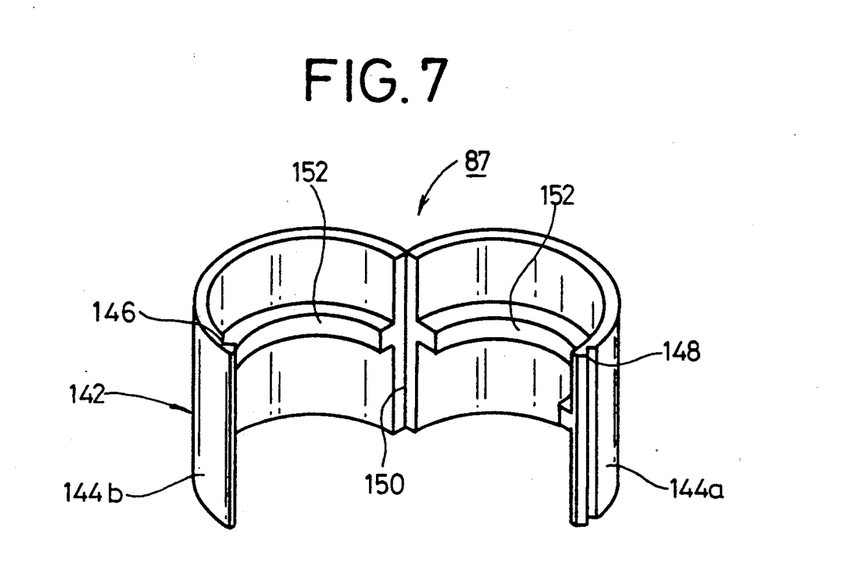
FIG. 7 is a perspective view of a joint guide according to another embodiment, which is used in the suction and conveying apparatus of this invention.

FIG. 7 illustrates another embodiment, in particular, of the joint guide 87 according to the present invention. In this embodiment, the same reference characters are given to the same constituent parts as those in the above-described embodiment, and their detailed description will be omitted. The same shall apply hereinafter.

In this embodiment, a joint guide 87 has a fixing member 142 in the form of a cylinder. As illustrated in FIG. 7, the fixing member 142 is composed of a set of a first member 144a and a second member 144b, which are in the form of a semicylinder and are openable to each other. The first and second members 144a and 144b have at their free edges a recess 146 and a projection 148, respectively, said recess and projection extending over the entire length in the axial direction. In order to make the fixing member 142 openable, a hinged part 150 is formed in the axial direction. The first and second members 144a and 144b are in the state that they have been joined to each other through the hinged part 150. On the inner wall surfaces of the first and second members 144a, 144b, are formed projecting parts 152 which circularly extend together corresponding to the circular groove defined by the release bush 76 and the guide member 78. By the way, the fixing member 142 is preferably molded as one body from a flexible plastic.

In such a construction, the first and second member 144a and 144b are opened through the hinged part 150 to insert the projecting parts 152 into the circular groove between the release bush 76 and the guide member 78. The first and second member 144a and 144b are then closed through the hinged part 150 to engage the recess 146 and the projection 148 with each other, whereby the fixing member 142 is installed so as to surround the release bush 76.

In this embodiment, the release bush 76 is fixed by the projecting parts 152 of the fixing member 142. Therefore, if a pushing pressure is applied to the release bush 76 due to careless operation, contact of tools and materials, or the like, the release bush 76 becomes free from the displacement or movement in the axial direction.

Figure 8:
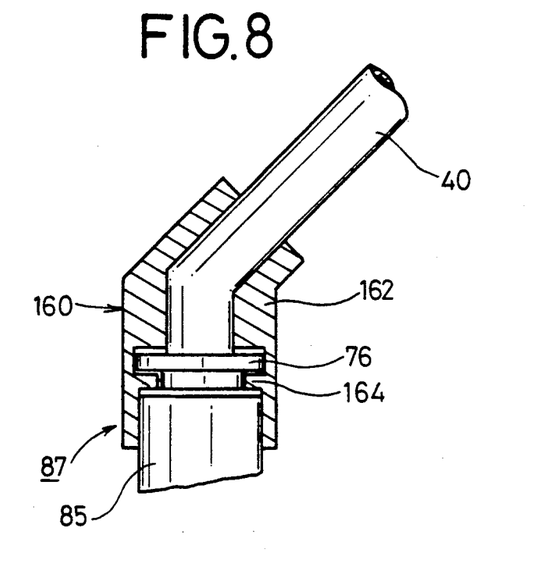
FIG. 8 is an explanatory vertical cross-sectional view of a joint guide according to a further embodiment, which is used in the suction and conveying apparatus of this invention.

In FIG. 8, is illustrated a joint guide according to a further embodiment, which is used in the suction and conveying apparatus of this invention.

Figure 9:
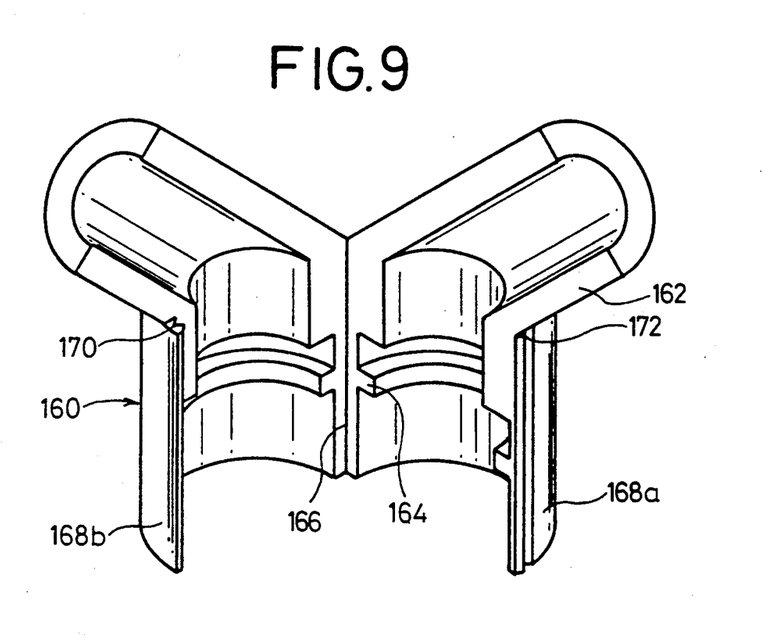
FIG. 9 is an explanatory perspective view of the joint guide shown in FIG. 8.

As with the last mentioned embodiment, a joint guide 87 according to this embodiment is preferably formed as one body from a flexible plastic. On the inner wall of the joint guide 87, are provided a guide part 162 and a projecting part 164 at its upper part and lower part, respectively (see FIG. 9). The guide part 162 is bent from the middle at a certain angle. The joint guide 87 is installed in such a way that the projecting part 164 provided at the lower part enters the circular groove defined between the release bush 76 and the guide member 78.

In this embodiment, first and second members 168a and 168b come near round a hinged part 166 to close them, whereby the guide part 162 provided at the upper part defines a hole corresponding to the thickness of the tube 40. Therefore, the tube 40 is forcedly guided in the predetermined direction by putting the tube 40 in the hole. The tube 40 hence becomes free from repeated flexure in the vicinity of the release bush 76 due to the operation of an arm of a robot, so that the durability of the tube 40 is increased. Moreover, since the tube 40 does not bend greatly, the configuration in section of the tube 40 is kept constant. Therefore, the pressure within the tube 40 remains substantially constant and hence, the flow of air is stabilized. Furthermore, even if the taking-out direction of the tube 40 is restricted due to installation positions among machines, the tube 40 can be guided by the guide part 162 so as to meet its line. By the way, referential characters 170 and 172 in FIG. 9 respectively indicate a projection and a recess, which constitute a lock mechanism.

The configuration of the guide part 162 is not limited to this embodiment. The angle to the axial direction of the joint guide 160 and the length may be optional and moreover the number of bent parts may be increased or its configuration may be set up to a curved form.

Figure 10:
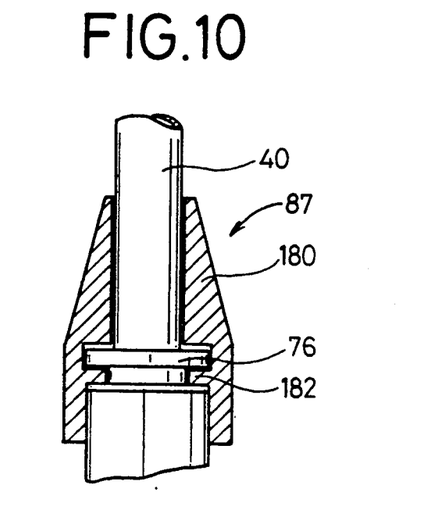
FIG. 10 is an explanatory vertical cross-sectional view of a joint guide according to still a further embodiment, which is used in the suction and conveying apparatus of this invention.

In FIG. 10, is illustrated a joint guide according to still a further embodiment, which is used in the suction and conveying apparatus of this invention.

In this embodiment, as with the first embodiment, a joint guide 87 is also preferably formed as one body from a considerably flexible plastic. On the inner wall of the joint guide 87, are provided a guide part 180 and a projecting part 182 at its upper part and lower part, respectively. The guide part 180 is formed so as to decrease its thickness as it becomes close to its tip. The projecting part 182 provided at the lower part is fitted to the circular groove defined between the release bush 76 and the guide member 78.

In this embodiment, since the thickness of the guide part 180 becomes thinner as it comes near to the tip, the guide part 180 has sufficient flexibility. Moreover, since its direction is not limited, the tube 40 can be guided fairly freely. Therefore, the tube 40 becomes free from repeated flexure due to the operation of an arm of a robot, so that the durability of the tube 40 is increased. Moreover, since the tube 40 does not bend, the configuration in section of the tube 40 is kept constant. Therefore, the pressure within the tube 40 remains substantially constant and hence, the flow of air is stabilized.

Figure 11:
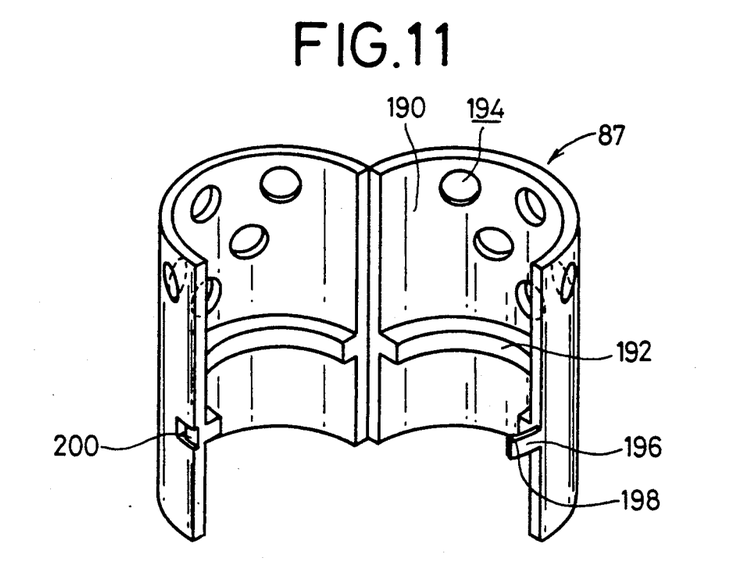
FIG. 11 is an explanatory perspective view of a joint guide according to yet still a further embodiment, which is used in the suction and conveying apparatus of this invention.

In FIG. 11, is illustrated a joint guide according to yet still a further embodiment, which is used in the suction and conveying apparatus of this invention.

As with the above-described embodiments, a joint guide 87 is also preferably formed as one body from a flexible plastic.

The joint guide 87 is basically in the form of a cylinder. On its inner wall, are provided a guide part 190 and a projecting part 192 at its upper part and lower part, respectively. The guide part 180 is formed so as to increase the number of holes 194 as it becomes close to its tip. The projecting part 192 provided at the lower part is fitted to the circular groove defined between the release bush 76 and the guide member 78. In the outer wall surface of the joint guide 87, are formed a stopper 196 and a recess 200 corresponding to a free edge 198 of the stopper 196. The free edge 198 of the stopper 196 is fitted in the recess 200.

In this embodiment, the thickness of the guide part 190 is uniform, but its flexibility is increased because of the provision of the holes 194 in the wall of the guide part 190. It is hence possible to achieve the same effect as in the other embodiments.

As described above, since the present invention permits the turning of the pipe joint about the outer periphery of the connector, the tube joined to the pipe joint can be smoothly connected to the vacuum and suction source without occurrence of looseness, torsion, etc. upon conducting the conveyance of works or the like.

The vacuum outlet in the pipe joint is not fixed, but can turn around the longitudinal axis of the connector at every angle. Therefore, piping for air can be performed within a limited space and moreover, it is possible to connect the tube from the vacuum and suction source to the vacuum outlet at the shortest distance required for the turning of the arm of the robot.

Further, the pipe joint can be turned about the outer periphery of the connector according to this invention and moreover pivotally moved on the connecting member in every direction, and the pipe joint itself may also be turned about its central longitudinal axis. Therefore, the tube joined to the pipe joint can be smoothly connected to the vacuum and suction source without occurrence of looseness, torsion, etc. upon conducting the conveyance of works or the like.

Furthermore, even if a limitation is imposed on the taking-out direction of the tube or the piping space, piping for air can be performed.

Moreover, according to the present invention, the release bush is fixed by the joint guide. It is hence possible to prevent the tube from slipping out even if the release bush is pushed carelessly. It is therefore possible to effectively avoid an inconvenient state such as falling of a work, thereby attempting the improvement in the safety of operation.

What is claimed is:

1. An apparatus for holding a workpiece by suction and conveying the workpiece, comprising:
   a pipe joint connected to a vacuum and suction source through a tube;
   a cylindrical connector connected to a suction pad;
   a connecting member through which the pipe joint is coupled to said cylindrical connector, said connecting member comprising a cylindrical sleeve angularly movably surrounding the outer periphery of said cylindrical connector;
   means provided between said cylindrical sleeve and said cylindrical connector for inhibiting movement of said cylindrical sleeve with respect to said cylindrical connector in a direction along a longitudinal axis thereof; and
   a coupling member for coupling the pipe joint to said connecting member, said coupling member being provided between said connecting member and said pipe joint.

2. An apparatus as claimed in claim 1, wherein the means for inhibiting movement of the cylindrical sleeve comprises an annular projection provided on one of an inner peripheral surface of the cylindrical sleeve and an outer peripheral surface of said cylindrical connector, and an annular recess provided opposite from said annular projection and receiving said annular projection therein.

3. An apparatus as claimed in claim 1, wherein said coupling member comprises a ball joint for swingably coupling the pipe joint to the cylindrical sleeve.

4. An apparatus as claimed in claim 1, further comprising:
   a tube connecting mechanism disposed on said pipe joint and equipped with a release bush, wherein said tube is freely detachable from said pipe joint by pushing said release bush; and
   a joint guide fitted so as to surround said release bush, said joint guide having a projecting part which enters a circular groove defined between the release bush and a guide member of said tube connecting mechanism to fix the release bush.

5. An apparatus as claimed in claim 4, wherein the joint guide is constructed so as to be openable and closable through a hinged part.

6. An apparatus as claimed in claim 5, wherein the joint guide has a guide part for guiding the tube in a predetermined direction.

7. An apparatus as claimed in claim 6, wherein the guide part of the joint guide is bent.

8. An apparatus as claimed in claim 6, wherein the guide part of the joint guide has a plurality of holes bored in its wall surface.

* * * * *